(12) United States Patent
Jung et al.

(10) Patent No.: US 11,851,189 B2
(45) Date of Patent: Dec. 26, 2023

(54) HYBRID AIR MOBILITY SYSTEM

(71) Applicants: Hyundai Motor Company, Seoul (KR); Kia Corporation, Seoul (KR)

(72) Inventors: Woo Suk Jung, Gyeonggi-do (KR); Sang Hyun Jung, Gyeonggi-do (KR); Byung Wook Chang, Incheon (KR); Keun Seok Lee, Gyeonggi-do (KR); Hee Kwang Lee, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 52 days.

(21) Appl. No.: 17/513,180

(22) Filed: Oct. 28, 2021

(65) Prior Publication Data

US 2022/0340286 A1 Oct. 27, 2022

(30) Foreign Application Priority Data

Apr. 23, 2021 (KR) .................. 10-2021-0053090

(51) Int. Cl.
*B64D 13/00* (2006.01)
*B64D 33/04* (2006.01)
(Continued)

(52) U.S. Cl.
CPC ............ *B64D 13/006* (2013.01); *B60L 50/61* (2019.02); *B64C 11/00* (2013.01); *B64D 27/24* (2013.01);
(Continued)

(58) Field of Classification Search
CPC . B64D 13/006; B64D 2027/026; B64D 33/04
See application file for complete search history.

(56) References Cited

U.S. PATENT DOCUMENTS

| 2,496,617 A * | 2/1950 | Burelbach ................ G09B 9/18 |
| | | 434/54 |
| 2015/0090844 A1 | 4/2015 | Braeutigam |

(Continued)

FOREIGN PATENT DOCUMENTS

KR 20170140972 A 12/2017

OTHER PUBLICATIONS

University of Cambridge, "Airplanes Finally go Hybrid-Electric", Dec. 23, 2014, https://phys.org/news/2014-12-airplanes-hybrid-electric.html (Year: 2014).*

(Continued)

*Primary Examiner* — Nicholas McFall
(74) *Attorney, Agent, or Firm* — Fox Rothschild LLP

(57) ABSTRACT

A hybrid air mobility system is capable of flying a long distance through effective operation of an engine and batteries. The hybrid air mobility system includes a fuselage configured to supply power to a propeller and electric equipment, the fuselage being provided with a duct including an inlet and an outlet so as to circulate air to the engine and the electric equipment; a deflector rotatably installed at the outlet of the duct so as to convert a discharge direction of exhaust gas generated by the engine and cooling air after cooling the electric equipment; and a controller configured to determine whether or not the engine is driven and to control a rotated position of the deflector depending on an amount of driving of the engine so as to selectively adjust movement of the exhaust gas and the cooling air towards the propeller.

10 Claims, 4 Drawing Sheets

(51) Int. Cl.
*B64D 27/02* (2006.01)
*B64C 11/00* (2006.01)
*B60L 50/61* (2019.01)
*F02D 9/04* (2006.01)
*B64D 27/24* (2006.01)

(52) U.S. Cl.
CPC ............... *B64D 33/04* (2013.01); *F02D 9/04* (2013.01); *B60L 2200/10* (2013.01); *B64D 2027/026* (2013.01)

(56) References Cited

U.S. PATENT DOCUMENTS

2015/0166194 A1    6/2015   Jactat et al.
2016/0236767 A1*   8/2016   Mores ....................... B64C 1/40

OTHER PUBLICATIONS

Jill Tallman, How it Works: Cowl Flaps Keeping Things Cool Under the Hood Nov. 1, 2017, AOPA, https://www.aopa.org/news-and-media/all-news/2017/november/flight-training-magazine/how-it-works-cowl-flaps (Year: 2017).*

* cited by examiner

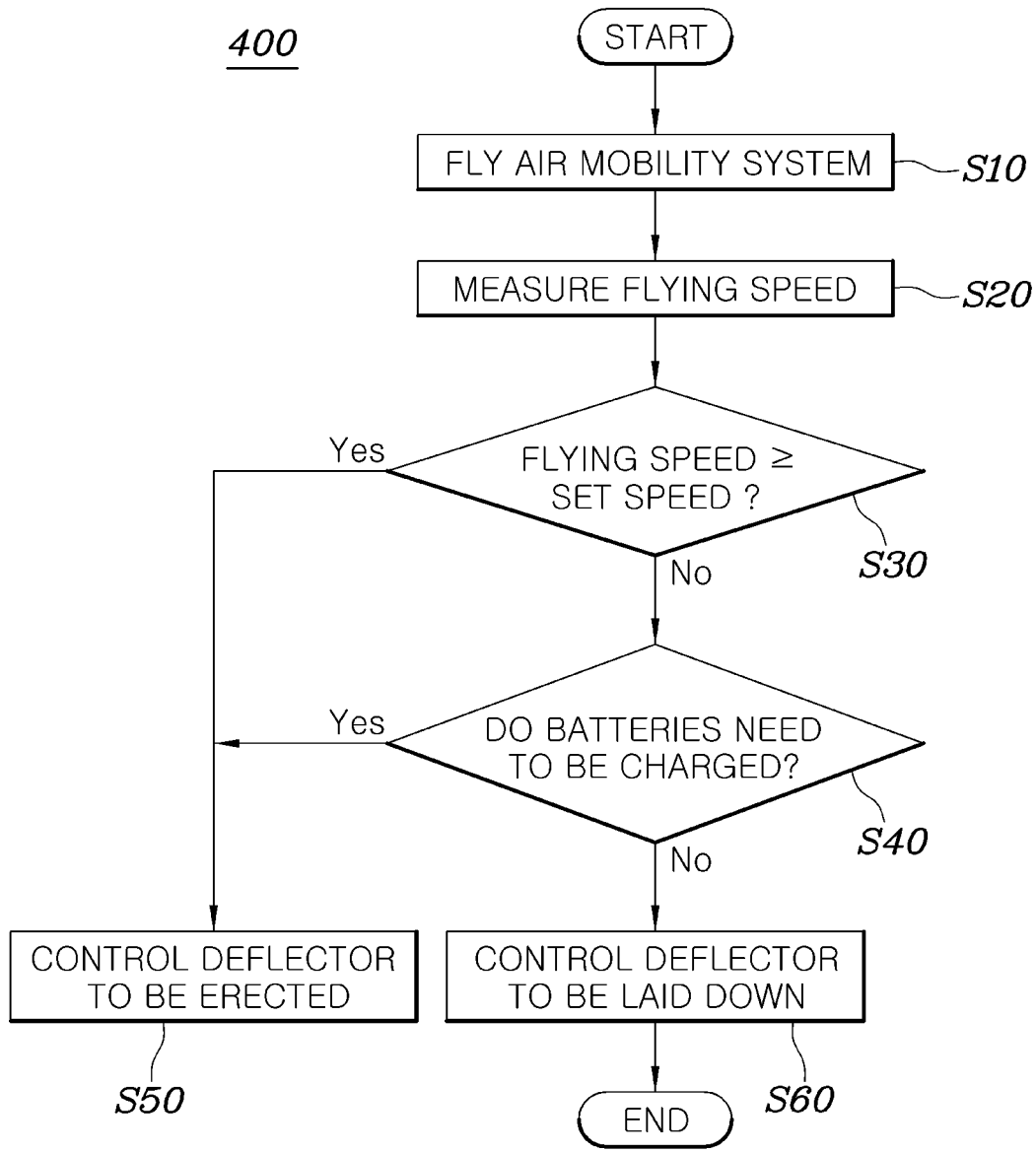

HYBRID AIR MOBILITY SYSTEM

CROSS-REFERENCE TO RELATED APPLICATION

This application claims under 35 U.S.C. § 119(a) the benefit of Korean Patent Application No. 10-2021-0053090, filed on Apr. 23, 2021 in the Korean Intellectual Property Office, the entire contents of which are incorporated herein by reference.

BACKGROUND

1. Technical Field

The present disclosure relates to a hybrid air mobility system that uses both an engine and batteries so as to increase electric energy efficiency of the batteries, and is capable of preventing damage to a propeller due to high-temperature exhaust gas generated by driving the engine.

2. Description of the Related Art

Recently, air mobility has been subject of research and development, and may be usable in various fields, such as cargo containers, medical treatment, and transportation, and is expected to progress to a commercialization stage due to energy efficiency improvements and stabilization schemes of air mobility.

An air mobility system or vehicle flies through driving of a propeller, but the use of batteries alone does not generate sufficient electrical energy to drive the propeller. That is, in order to realize long-distance flights of the air mobility system, a hybrid mode in which an internal combustion engine is used together with the batteries is applied. In such a hybrid mode, the propeller is driven using electric energy of the batteries, and any shortage of the electrical energy is compensated for by power generated by the internal combustion engine.

When the propeller is disposed behind the engine, exhaust gas is discharged from the internal combustion engine and may be transmitted to the propeller, and for that reason, the propeller typically is formed of metal having excellent thermal resistance. However, the metal propeller may have problems due to the heavy weight thereof. Therefore, a propeller formed of a composite material having a reduced weight may be used, but the propeller formed of the composite material is relatively vulnerable to heat and thus deterioration of the performance thereof or damage thereto may be caused by high-temperature exhaust gas.

Therefore, a structure in which a propeller is disposed in front of an engine may be applied to air mobility systems, but because passengers or baggage and various sensing apparatuses are generally disposed in a front portion of an air mobility system, there is a restriction on a structure in which the propeller is disposed in front of the engine.

That is, measures to minimize damage to a propeller due to exhaust gas from an engine in the structure in which the propeller is disposed behind the engine are required.

The above information disclosed in the Background section is only for enhancement of understanding of the background of the disclosure and should not be interpreted as conventional technology that is already known to those skilled in the art.

SUMMARY

Therefore, the present disclosure provides a hybrid air mobility system which is capable of flying a long distance through effective operation of an internal combustion engine and batteries, while preventing damage to a propeller due to high-temperature exhaust gas generated by the engine during driving of the engine.

In accordance with the present disclosure, the above and other objects can be accomplished by the provision of a hybrid air mobility system including a fuselage equipped with an engine and a generator, the fuselage configured to supply power to a propeller and electric equipment, and the fuselage provided with a duct including an inlet and an outlet so as to circulate air to the engine and the electric equipment; a deflector rotatably installed at the outlet of the duct so as to convert a discharge direction of exhaust gas generated by the engine and cooling air after cooling the electric equipment; and a controller configured to determine whether or not the engine is driven and to control a rotated position of the deflector depending on an amount of driving of the engine so as to selectively adjust movement of the exhaust gas and the cooling air towards the propeller.

The propeller may be installed at a rear portion of the fuselage, and the duct may be provided in front of the propeller so that the engine and the generator are located in front of the propeller.

A guide configured to divide air introduced into the duct through the inlet into two portions circulated to the engine and the electric equipment respectively may be installed in the duct.

The duct may be divided into a first circulation path configured to extend from the inlet towards the engine, and a second circulation path configured to extend from the inlet to the outlet and provided with the electric equipment disposed therein, by the guide.

An exhaust port of the engine configured to discharge the exhaust gas therethrough may be disposed in the duct, and the electric equipment may be disposed in front of the exhaust port of the engine between the inlet and the outlet of the duct.

The engine and the generator may be mounted in the fuselage, the electric equipment may be provided in the duct, and an exhaust port of the engine may extend towards the duct so as to be open in a direction perpendicular to air circulation paths within the duct.

The controller may receive flying speed information of the fuselage, and may control a rotated position of the deflector so that the deflector is erected towards the outlet, when the engine is driven in a state in which the flying speed of the fuselage is equal to or higher than a set speed.

Batteries electrically connected to the generator may be mounted in the fuselage, and the controller may control a rotated position of the deflector so that the deflector is erected towards the outlet, when the engine is driven to charge the batteries.

BRIEF DESCRIPTION OF THE DRAWINGS

The above and other objects, features and other advantages of the present disclosure will be more clearly understood from the following detailed description taken in conjunction with the accompanying drawings, in which:

FIG. 4 is a flowchart illustrating a method for controlling the hybrid air mobility system according to the present disclosure.

DETAILED DESCRIPTION OF THE PREFERRED EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, a hybrid air mobility system according to an exemplary embodiment of the present disclosure will be described with reference to the accompanying drawings.

Figure 1:
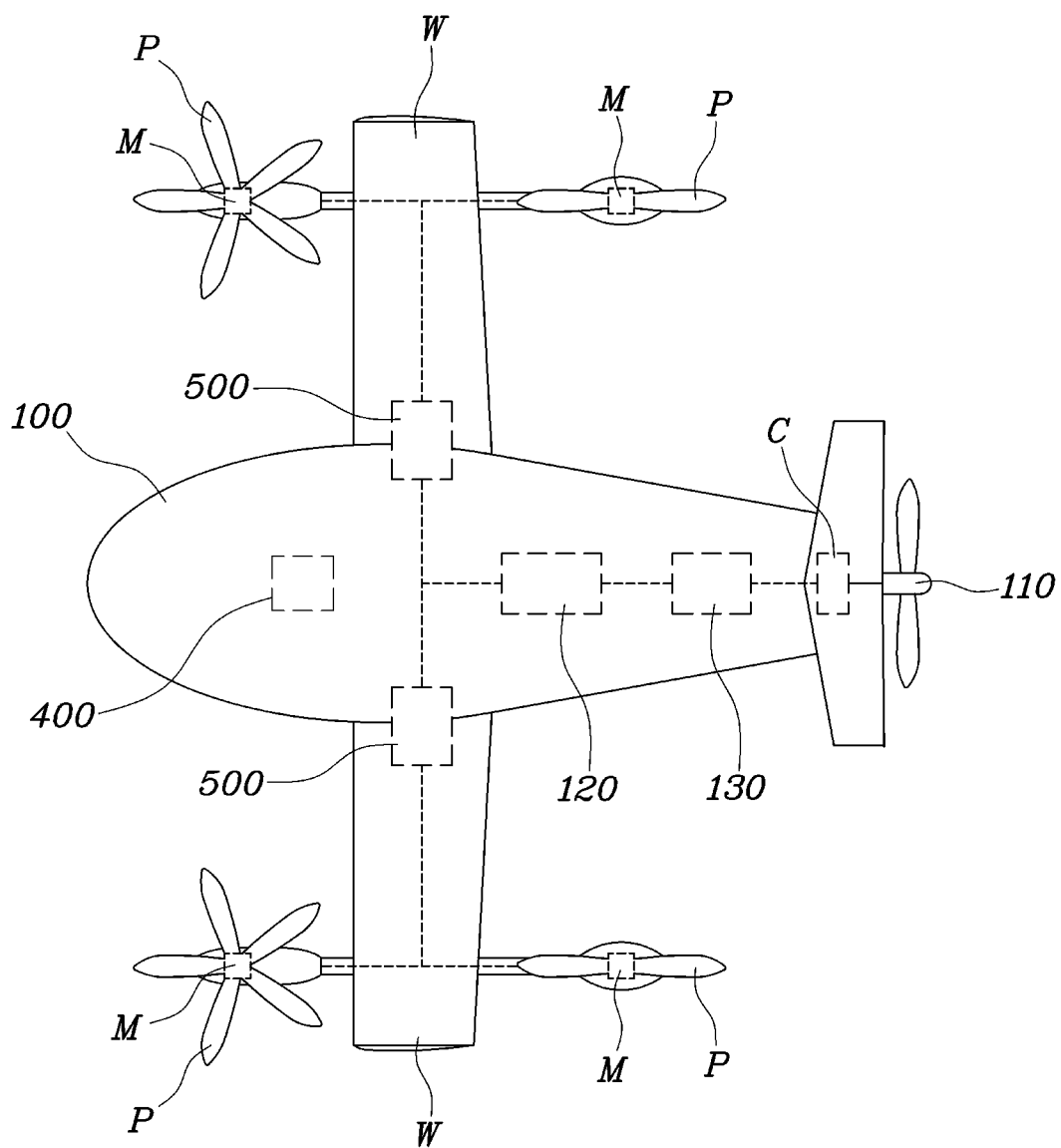
FIG. 1 is a view illustrating a hybrid air mobility system according to the present disclosure.
Figure 2:
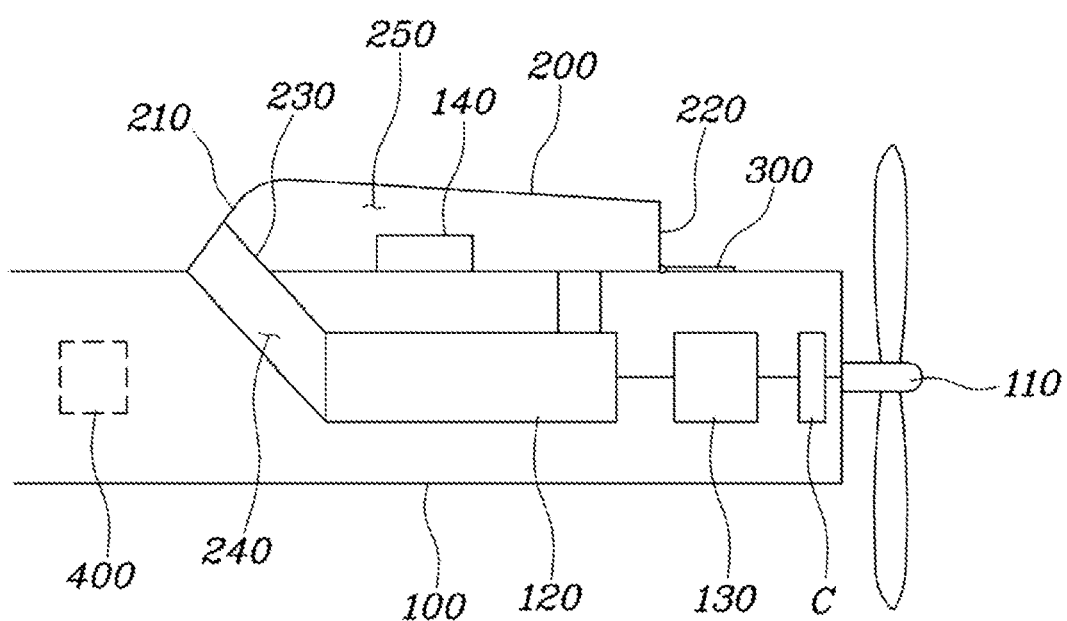
FIG. 2 is a view illustrating the state of a deflector according to the present disclosure before unfolding.
Figure 3:
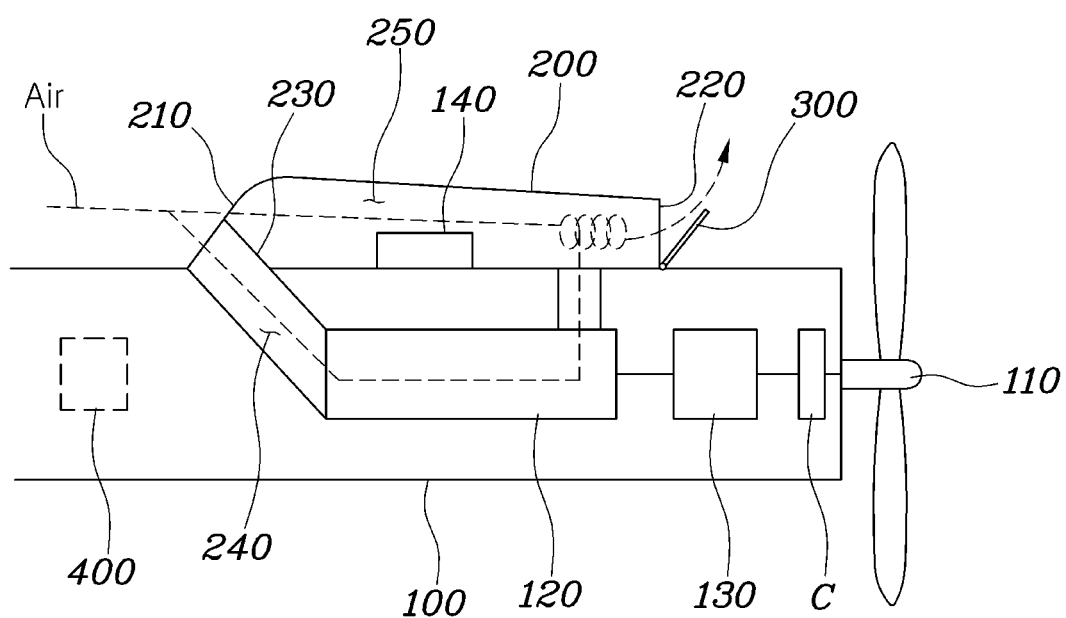
FIG. 3 is a view illustrating the state of the deflector according to the present disclosure after unfolding.

FIG. 1 is a view illustrating a hybrid air mobility system according to the present disclosure, FIG. 2 is a view illustrating the state of a deflector according to the present disclosure before unfolding, FIG. 3 is a view illustrating the state of the deflector according to the present disclosure after unfolding, and FIG. 4 is a flowchart illustrating a method for controlling the hybrid air mobility system according to the present disclosure.

The hybrid air mobility system according to the present disclosure includes, as shown in FIGS. 1 to 3, a fuselage 100 equipped with an engine 120 and a generator 130, configured to supply power to a propeller 110 and electric equipment 140, and provided with a duct 200 including an inlet 210 and an outlet 220 so as to circulate air to the engine 120 and the electric equipment 140; a deflector 300 rotatably installed at the outlet 220 of the duct 200 so as to convert the discharge direction of exhaust gas generated by the engine 120 and cooling air after cooling the electric equipment 140; and a controller 400 configured to determine whether or not the engine 120 is driven and to control the rotated position of the deflector 300 depending on the amount of driving of the engine 120 so as to selectively adjust movement of the exhaust gas and the cooling air towards the propeller 110.

In the present disclosure, in order to drive the propeller 110, the electric equipment 140 including electric parts, such as an oil cooler, is provided in the fuselage 100, in addition to the engine 120, the generator 130 and batteries 500.

Here, the engine 120 is an internal combustion engine configured to burn fuel so as to generate power, and the batteries 500 store electrical energy. The generator 130 receives the power generated by the engine 120 and generates electric power, or is driven by electric power transmitted from the batteries 500 and generates rotating power to operate the propeller 110. Therefore, the generator 130 is connected to the propeller 110 via a clutch C, and the rotating power from the generator 130 is selectively transmitted to the propeller 110 depending on whether or not the clutch C is engaged. Such a propeller 110 generates thrust so that the fuselage 100 may fly forwards, and may be provided at the rear portion of the fuselage 100.

In addition, a plurality of propellers P is provided on wings W of the fuselage 100 so as to generate thrust in the upward and downward directions when the fuselage 100 takes off or lands, and the corresponding propellers P may be driven by separate motors M electrically connected to the batteries 500.

That is, as shown in FIG. 1, the fuselage 100 is provided with the wings W configured to generate lift during flight, and the propellers P installed on the wings W generate thrust in the upward and downward directions. The propeller 110 installed at the rear portion of the fuselage 100 generates thrust by which the air mobility system flies forwards.

Particularly, in the air mobility system according to the present disclosure, the propeller 110 is installed at the rear portion of the fuselage 100, and the duct 200 is provided in front of the propeller 110 so that the engine 120 and the generator 130 are located in front of the propeller 110, thereby allowing passengers or baggage to be located in the front portion of the fuselage 100 and additional devices including various sensing devices to be easily installed. Further, parts including the engine 120, the generator 130 and the electric equipment 140 are disposed in the rear portion of the fuselage 100, and the passengers, the baggage and additional equipment are provided in the front portion of the fuselage 100, thereby improving balance of the fuselage 100.

Further, in the hybrid air mobility system according to the present disclosure, the deflector 300 is rotatably installed at the outlet 220 of the duct 200 so as to convert the discharge direction of the exhaust gas generated by the engine 120 and the cooling air after cooling the electric equipment 140. Such a deflector 300 may be controlled by the controller 400, and may include a linear actuator or be rotated by the operation of a separate motor via a link structure. The deflector 300 has a size equal to or less than the size of the outlet 220 so as to minimize an increase in drag due to the deflector 300 in flight of the air mobility system.

Therefore, the controller 400 controls the rotated position of the deflector 300 by determining whether or not the engine 120 is driven. That is, the controller 400 controls the rotated position of the deflector 300 so that the deflector 300 is erected towards the outlet 220 of the duct 200, when the engine 120 is driven and high-temperature exhaust gas is generated due to an increase in the amount of driving of the engine 120. Thereby, when the high-temperature exhaust gas generated due to driving of the engine 120 is discharged through the outlet 220 of the duct 200, the discharge direction of the exhaust gas is converted by the deflector 300, and thus the exhaust gas is not directly transmitted to the propeller 110 and damage to the propeller 110 due to exhaust gas is avoided.

In particular, in the hybrid air mobility system according to the present disclosure, a guide 230, which divides air introduced into the duct 200 through the inlet 210 into two portions circulated to the engine 120 and the electric equipment 140 respectively, is installed in the duct 200. The guide 230 divides air introduced into the inlet 210 into the two portions circulated to the engine 120 and the electric equipment 140, thereby simultaneously supplying air necessary to drive the engine 120 and air necessary to cool the electric equipment 140. That is, the total area of the inlet 210 of the duct 200 is divided by the guide 230 and, because the amount of air required by the engine 120 is generally relatively large, the guide 230 may be disposed to divide the total area of the inlet 210 of the duct 200 such that one divided area of the inlet 210 to supply air to the engine 120 is greater than the other divided area of the inlet 210 to supply air to the electric equipment 140.

Thereby, as shown in FIG. 2, the duct 200 may be divided into a first circulation path 240 which extends from the inlet 210 towards the engine 120, and a second circulation path 250 which extends from the inlet 210 to the outlet 220 and is provided with the electric equipment 140 disposed therein, by the guide 230.

That is, the duct 200 is divided from the inlet 210 into the first circulation path 240 and the second circulation path 250 by the guide 230, and thus a portion of air introduced into the inlet 210 is circulated towards the engine 120 along the first circulation path 230, and the remaining portion of the air is circulated towards the electric equipment 140 along the second circulation path 240. Therefore, the air circulated towards the engine 120 along the first circulation path 240 of the duct 200 is used to burn fuel so as to be used as a power source, and the air circulated towards the electric equipment 140 along the second circulation path 250 cools the electric equipment 140.

An exhaust port of the engine 120, through which exhaust gas is discharged, is disposed in the duct 200, and the electric equipment 140 is disposed in front of the exhaust port of the engine 120 between the inlet 210 and the outlet 220 of the duct 200.

Further, the engine 120 and the generator 130 are mounted in the fuselage 100, the electric equipment 140 is provided in the duct 200, and the exhaust port of the engine 120 extends towards the duct 200 so as to be open in a direction perpendicular to the air circulation paths 240 and 250 within the duct 200.

As shown in FIG. 3, the electric equipment 140 is disposed in front of the exhaust port of the engine 120 between the inlet 210 and the outlet 220 of the duct 200, and thereby, introduced air may cool the electric equipment 140 and then be mixed with exhaust gas discharged through the exhaust port of the engine 120 in flight of the air mobility system. That is, the exhaust gas from the engine 120 has a high temperature, and the cooling air after cooling the electric equipment 140 has a lower temperature than the exhaust gas even though it cools the electric equipment 140. Therefore, the air introduced into the inlet 210 of the duct 200 cools the electric equipment 140, and lowers the temperature of the exhaust gas discharged through the outlet 220 through heat exchange with the exhaust gas after cooling the electric equipment 140, thus preventing damage to the propeller 110 due to the exhaust gas discharged through the outlet 220. Further, the exhaust port of the engine 120 is formed to be open in the direction perpendicular to the air circulation paths 240 and 250 of the duct 200, thereby further facilitating mixing of the exhaust gas discharged through the exhaust port of the engine 120 and the cooling air after cooling the electric equipment 140. Further, because the electric equipment 140 is disposed in front of the exhaust port of the engine 120, the electric equipment 140 is not influenced by the exhaust gas and is thus smoothly cooled, when the air mobility system is cruising.

The controller 400 controls the deflector 300 depending on the driving state of the engine 120, as shown in FIG. 4 (S10-S60).

That is, the controller 400 may receive the flying speed information of the fuselage 100, and may control the rotated position of the deflector 300 so that the deflector 300 is erected towards the outlet 220, when the engine 120 is driven in the state in which the flying speed of the fuselage 100 is equal to or higher than a set speed.

The controller 400 receives the flying speed information of the fuselage 100 through sensors provided in the fuselage 100. Thereby, the controller 400 determines that high-temperature exhaust gas discharged from the engine 120 is capable of damaging the propeller 110 depending on an increase in the momentum of the high-temperature exhaust gas towards the propeller 110 when the flying speed of the fuselage 100 is equal to or higher than the set speed. Therefore, the controller 400 controls the rotated position of the deflector 300 so that the deflector 300 is erected towards the outlet 220, when the flying speed of the fuselage 100 is equal to or higher than a set speed, thereby converting the discharge direction of the exhaust gas discharged through the outlet 220 through the deflector 300. Thus, the exhaust gas discharged through the outlet 220 of the duct 200 does not directly interfere with the propeller 110, thereby preventing damage to the propeller 110 due to the high-temperature exhaust gas. Further, the deflector 300 is erected towards the outlet 220 of the duct 200, and thus causes interference to the flow of the exhaust gas through the outlet 220, thereby facilitating mixing of the exhaust gas with the cooling air after cooling the electric equipment 140. Thereby, influence on the propeller 110 by the exhaust gas discharged through the outlet 220 is reduced, and thus damage to the propeller 110 may be prevented. Thereafter, the controller 400 controls the rotated position of the deflector 300 so that the deflector 300 is laid down, when the flying speed of the fuselage 100 is lower than the set speed.

The batteries 500 electrically connected to the generator 130 are mounted in the fuselage 100, and the controller 400 controls the rotated position of the deflector 300 so that the deflector 300 is erected towards the outlet 220, when the engine 120 is driven to charge the batteries 500.

When the state of charge (SOC) of the batteries 500 provided in the fuselage 100 is low and thus the batteries 500 need to be charged, the batteries 500 are changed with electrical energy produced by the operation of the engine 120 and the generator 130. Here, as the SOC of the batteries 500 is decreased, the amount of driving of the engine 120 is increased, and thus generation of high-temperature exhaust gas may be increased.

Therefore, the controller 400 controls the rotated position of the deflector 300 so that the deflector 300 is erected towards the outlet 220, when the engine 120 is driven to charge the batteries 500, and thus prevents the exhaust gas discharged through the outlet 220 of the duct 200 from directly interfering with the propeller 110, thereby preventing damage to the propeller 110. Further, the deflector 300 is erected towards the outlet 220 of the duct 200, and thus causes interference to the flow of the exhaust gas through the outlet 220, thereby facilitating mixing of the exhaust gas with the cooling air after cooling the electric equipment 140. Thereby, influence on the propeller 110 by the exhaust gas discharged through the outlet 220 is reduced, and thus damage to the propeller 110 is prevented.

As described above, the hybrid air mobility system having the above-described structure may fly a long distance through effective operation of the engine 120 and the batteries 500. Further, in the structure in which the propeller 110 is provided at the rear portion of the air mobility system, high-temperature exhaust gas generated during driving of the engine 120 does not directly interfere with the propeller 110, and thus damage to the propeller 110 due to the high-temperature exhaust gas may be prevented.

As is apparent from the above description, a hybrid air mobility system having the above-described structure according to the present disclosure may fly a long distance through effective operation of an engine and batteries. Further, in a structure in which a propeller is provided at the rear portion of the air mobility system, high-temperature exhaust gas generated during driving of the engine does not directly interfere with the propeller, and thus damage to the propeller due to the high-temperature exhaust gas may be prevented.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A hybrid air mobility system, comprising:
   a fuselage equipped with an engine and a generator, the fuselage connected to a propeller and electric equipment for supplying power to the propeller and the electric equipment, and the fuselage being provided with a duct comprising an inlet and an outlet, wherein the duct circulates air to the engine and the electric equipment;
   a deflector rotatably installed at the outlet of the duct, wherein the deflector converts a discharge direction of exhaust gas generated by the engine and cooling air after cooling the electric equipment; and
   a controller configured to determine whether or not the engine is driven and to control a rotated position of the deflector depending on an amount of driving of the engine so as to selectively adjust movement of the exhaust gas and the cooling air towards the propeller.

2. The hybrid air mobility system according to claim 1, wherein the propeller is installed at a rear portion of the fuselage, and the duct is provided in front of the propeller so that the engine and the generator are located in front of the propeller.

3. The hybrid air mobility system according to claim 1, wherein a guide configured to divide air introduced into the duct through the inlet into two portions circulated to the engine and the electric equipment respectively is installed in the duct.

4. The hybrid air mobility system according to claim 3, wherein the duct is divided into a first circulation path configured to extend from the inlet towards the engine, and a second circulation path configured to extend from the inlet to the outlet and provided with the electric equipment disposed therein, by the guide.

5. The hybrid air mobility system according to claim 1, wherein:
   an exhaust port of the engine configured to discharge the exhaust gas therethrough is disposed in the duct; and
   the electric equipment is disposed in front of the exhaust port of the engine between the inlet and the outlet of the duct.

6. The hybrid air mobility system according to claim 1, wherein the engine and the generator are mounted in the fuselage, the electric equipment is provided in the duct, and an exhaust port of the engine extends towards the duct so as to be open in a direction perpendicular to air circulation paths within the duct.

7. The hybrid air mobility system according to claim 1, wherein the controller receives flying speed information of the fuselage, and controls a rotated position of the deflector so that the deflector is erected towards the outlet, when the engine is driven in a state in which the flying speed of the fuselage is equal to or higher than a set speed.

8. The hybrid air mobility system according to claim 1, wherein:
   batteries electrically connected to the generator are mounted in the fuselage; and
   the controller controls a rotated position of the deflector so that the deflector is erected towards the outlet, when the engine is driven to charge the batteries.

9. The hybrid air mobility system according to claim 1, wherein the controller is configured to control the rotated position of the deflector so that the deflector is erected toward the outlet of the duct when the engine is driven.

10. The hybrid air mobility system according to claim 9, wherein when the deflector is erected, the exhaust gas is configured to be directed away from the propeller.

* * * * *